(12) United States Patent
Crenshaw et al.

(10) Patent No.: US 10,779,380 B2
(45) Date of Patent: Sep. 15, 2020

(54) POWER OVER ETHERNET EXIT SIGNAGE

(71) Applicant: IOTA ENGINEERING, LLC, Tucson, AZ (US)

(72) Inventors: David Crenshaw, Tucson, AZ (US); Rafael Ordonez Gonzalez, Tucson, AZ (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 16/361,057

(22) Filed: Mar. 21, 2019

(65) Prior Publication Data

US 2019/0297710 A1 Sep. 26, 2019

Related U.S. Application Data

(60) Provisional application No. 62/646,251, filed on Mar. 21, 2018.

(51) Int. Cl.
| | |
|---|---|
| *H05B 33/00* | (2006.01) |
| *H05B 47/185* | (2020.01) |
| *F21S 9/02* | (2006.01) |
| *H04L 12/28* | (2006.01) |
| *H02J 9/06* | (2006.01) |
| *F21V 23/02* | (2006.01) |

(52) U.S. Cl.
CPC ............ *H05B 47/185* (2020.01); *F21S 9/022* (2013.01); *F21V 23/02* (2013.01); *H02J 9/065* (2013.01); *H04L 12/2881* (2013.01)

(58) Field of Classification Search
CPC ............ H05B 37/0272; H05B 37/0254; H05B 37/0245; H05B 33/0854; H05B 33/0809; H05B 37/0218; H05B 33/0842; H05B 37/0227; H05B 37/0263; H05B 37/029; H05B 33/0845; H05B 33/0857; H05B 37/0209; H05B 33/0827; H05B 33/0872; H05B 37/02; H05B 33/0803; H05B 33/0815; H05B 33/08; H05B 33/0812; H05B 33/086; H05B 33/0863; H05B 33/0866; H05B 33/0869; H05B 33/0896; H05B 37/0281; H05B 37/04
See application file for complete search history.

(56) References Cited

U.S. PATENT DOCUMENTS

2017/0126016 A1* 5/2017 Andrews .................. H02J 4/00
2018/0294982 A1* 10/2018 Boemi .................... H04L 12/10

* cited by examiner

*Primary Examiner* — Monica C King
(74) *Attorney, Agent, or Firm* — Quarles & Brady LLP (57) ABSTRACT

A system for providing power over Ethernet illuminated signage is provided. The system includes receiving lighting instructions via an Ethernet compatible communications protocol, translating those instructions to a lower bandwidth, slower protocol while passing through DC power. Illumination fixtures are powered by the passed-through power and operated in accordance with the translated instructions.

20 Claims, 10 Drawing Sheets

POWER OVER ETHERNET EXIT SIGNAGE

CROSS-REFERENCE TO RELATED APPLICATIONS

The present application claims priority to U.S. Provisional Application 62/646,251 entitled "Power Over Ethernet Signage", filed on Mar. 21, 2018, which is incorporated herein by reference in its entirety.

TECHNICAL FIELD

The present invention relates to interior building signage and lighting, such as emergency exit signage, and in particular to signage powered by power over Ethernet ("PoE") systems.

BACKGROUND

Building codes and standards provide strict functional requirements for in-building emergency exit signage. Under existing standards, an exit sign must be provided at each exterior building exit and at each interior building exit (i.e., an exit from an interior building space to a stairway or hallway connecting to an exterior exit), and must be provided such that an exit sign indicating an exit, or the direction toward an exit, can be seen from anywhere in an interior hallway. Additionally, standards require that building exit signs be illuminated, which illumination must be maintained in the event of a power outage or other emergency such as a fire or flood. Certain exit signs have additional functionality, such as strobes or integrated lamps to illuminate the area around the sign and the exit door. Conventionally, exit signs are powered through a connection to a building's standard AC power service, and conventional systems can include backup batteries for maintaining illumination under power down or other emergency conditions.

Figure 1:
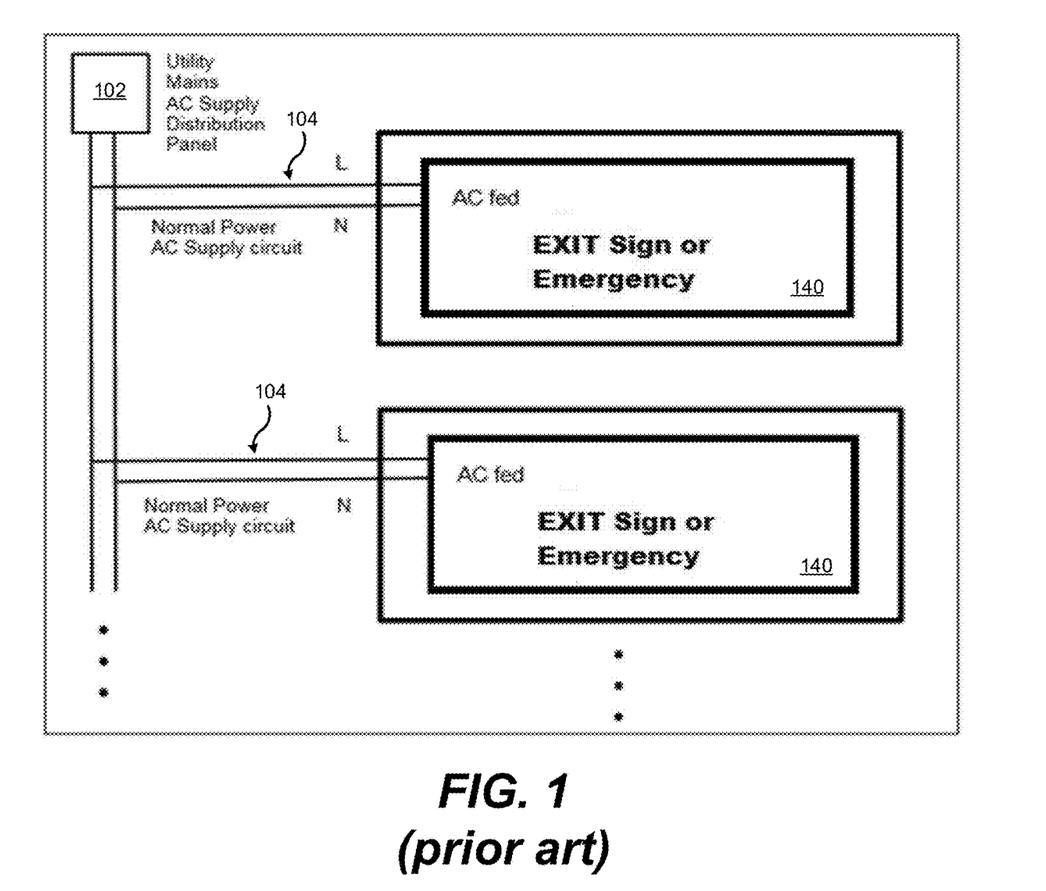
FIG. 1 is a schematic representation of a conventional method for supplying power to illuminated exit signs from AC mains power.

FIG. 1 illustrates a conventional arrangement for providing illuminated exit signs or emergency luminaires. In the conventional arrangement, an AC power line is connected to a distribution panel for mains AC power, which in North America is typically 120, 240 or 277 VAC, 60 Hz. Connected across this line are one or more illuminated exit signs or emergency lights (hereinafter, "fixtures"). Not illustrated in FIG. 1 are the internal components of the individual fixtures, which may include lighting ballasts and fluorescent lamps and additional ballasts and lamps for the auxiliary strobes or spotlights described above. In the event that the fixture includes LED lamps, the sign will include rectifying and filtering electronics to convert the incoming AC power to DC and LED drivers or controllers to run the individual LED illuminators. Per code, building exit signs and emergency lights must be kept illuminated in the event of a power down condition, so some fixtures will include back up batteries, along with charging electronics and electronics to manage the switch-over to the battery. In other installations, backup power may be provided upstream of the fixtures, with a backup battery near the connection to mains.

The promulgation of IEEE standards for power-over-Ethernet ("PoE"), combined with the ubiquity of RJ45 Ethernet cabling in modern business and residential buildings, provides alternative means for building lighting, including the illumination and powering of emergency exit signs and emergency lighting fixtures. There are at present three ratified IEEE standards for PoE: IEEE 802.3af, IEEE 802.3at, and IEEE 802.3bt. An Ethernet port operating in accordance with the IEEE 802.3af standard is capable of supplying 12.95 Watts to powered devices ("PDs") over a PoE link. IEEE 802.3at defines the PoE+ standard, which enables the delivery of up to 25.5 W over a PoE link. Currently, more advanced methods of this PoE standard provides up to 60 Watts (e.g., PoE+ and PoE++). The PoE standard IEEE 802.3bt specifies equipment capable of supplying up to 90 W over a PoE link.

Figure 2:
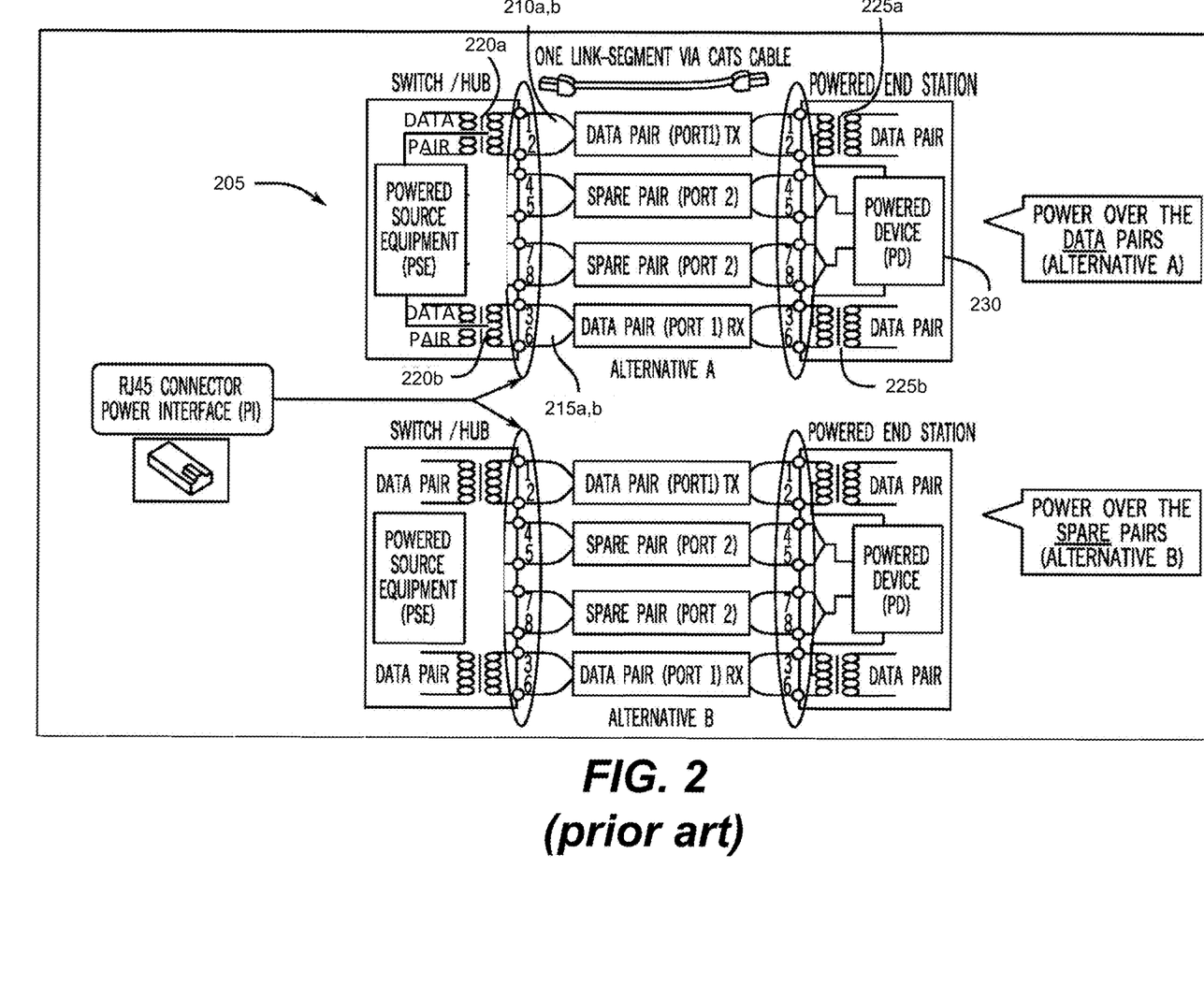
FIG. 2 is a schematic illustration of a conventional Power-over-Ethernet link.

Realizing a PoE link over the physical connections of Cat5+ Ethernet cable is done according to one of two alternatives, illustrated schematically in FIG. 2. As can be seen in FIG. 2, an RJ45 Ethernet cable 205 carries eight conductors grouped as four twisted pairs (210a,b and 215a, b), with two twisted pairs (e.g., 210, 215) forming a communication link for a first port (transmit and receive), and with the two remaining twisted pairs available as spares (e.g., 215a,b). In Alternative A, a DC voltage is supplied over data lines, across center taps on internal signal coupling transformers (220 a,b) connected across the pair of conductors on each of the transmit and receive twisted pairs. The DC voltage is then supplied from the center taps of another pair of transformers (225a,b) across the receive-side twisted pairs for the transmit and receive lines. This DC voltage is supplied to a powered device 230 on the receive end of the link. In Alternative B of the PoE standard, DC voltage is supplied through the unused or spare twisted pairs. Newer and proposed PoE standards provide more power and faster data using all 8 conductors. These methods require 4 data transformers, where power is imposed on all pairs.

A PoE network is arranged in a Point-to-Point topology, referred to as a "star" configuration. The standard Ethernet star topology, compared to other topologies, reduces the impact of node failures and provides isolation of errors so that the rest of the network will be unaffected, while maintaining communication speeds. PoE was introduced in 2003 and utilized the existing, mature and highly developed Ethernet with its star topology. PoE is a system where power and data are transmitted together over one cable. The transmitted power and data are intended for one single termination at each end of the cable (i.e., one ink segment). The power and data of one PoE port link segment are for use between one port from the PSE and one PD with a local IP address at the PD. The power capability of one PoE port link segment is significant, currently supporting 60 Watts, with future power levels planned to approach 90 Watts. Additionally, the digital communications speed capability of one PoE Port Link Segment is currently 1 Gb/s and approaching 10 Gb/s for future standards-based systems. Therefore, a one-to-one match in capability, both in terms of power and digital data communications, between the PoE Port link segment and the PD is helpful for full utilization of each port to be practical.

Figure 3:
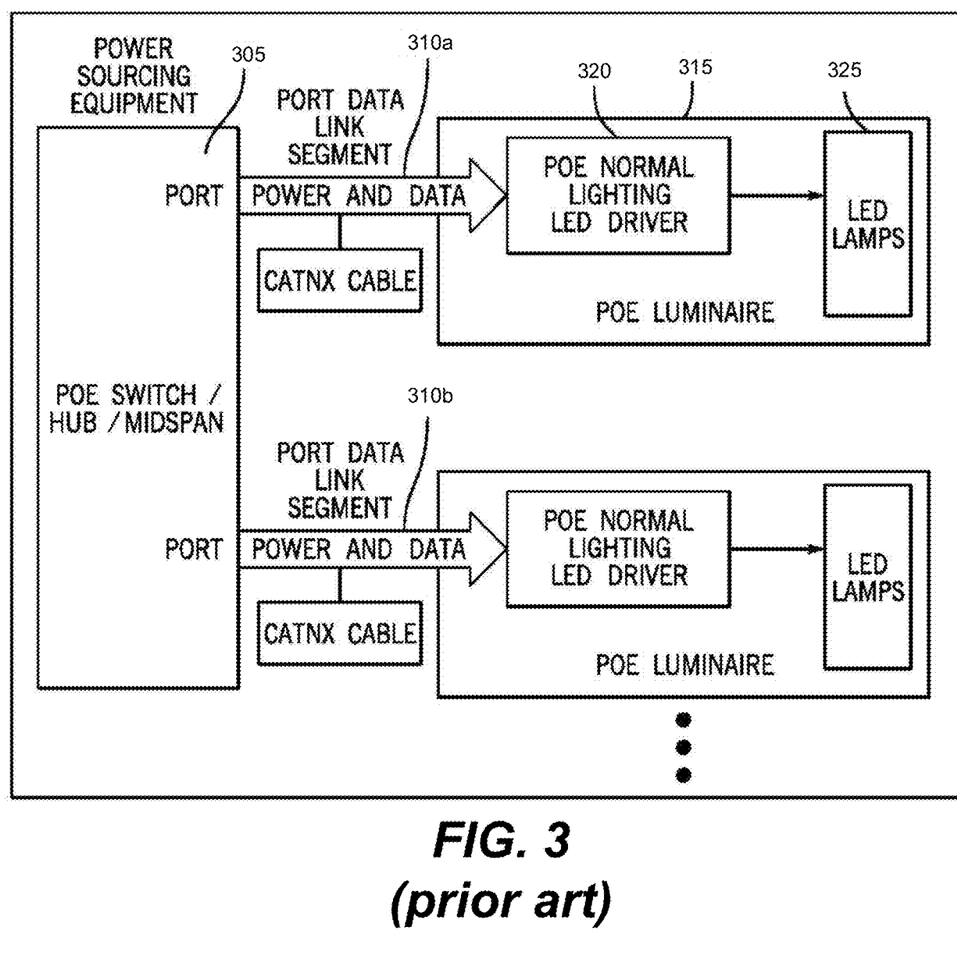
FIG. 3 is a schematic illustration of a conventional LED-based PoE lighting system.

In recent years, with the declining cost and increased efficiency of light emitting diodes ("LEDs"), LED lighting has begun to replace fluorescent and incandescent lighting in commercial settings. FIG. 3 is a schematic representation of a conventional LED lighting installation powered by a PoE link, or more precisely, an Ethernet cable referred to under the PoE standards as a Port Data Link Segment. 48V DC nominal is supplied over the link by power sourcing equipment ("PSE") 305 (e.g., a PoE switch, hub or midspan injector). The power is superimposed on data transmission wire pairs of an Ethernet link segment 310 (e.g., 310a, b) carried on a CATnx (e.g., CAT5e) cable. The link segments (310a,b) supply power to a Powered Device ("PD"), for example, PoE luminaire Lighting LED Driver 320, where the power is intelligently extracted (i.e., separated from the data) at the PD. Power extraction occurs at a PoE Lighting LED Driver 320, which appears to the PSE as any conventional PD operating according to the PoE standards. Power is then delivered by the driver 320 to LED lamps 325. In certain conventional implementations, driver 320 and LED lamps 325 are co-located in an LED luminaire 315, which is installed, for example at an illuminated exit sign.

Digital communications standards have been developed that permit the digital control of building lighting fixtures. One such standard is the Digital Addressable Lighting Interface standard, IEC 62838 (hereinafter "the DALI standard" or "DALI") promulgated by the International Electrotechnical Commission ("IEC"). The DALI standard is available for purchase through the IEC at 3, rue de Varembé, 1st floor, P.O. Box 131, CH—1211 Geneva 20—Switzerland or by calling 41 22 919 02 11 and through the IEC's webstore at webstore.iec.ch. The DALI standard is incorporated by reference herein as though set forth in its entirety.

Under the DALI standard, a lighting controller (a host controller) including a digital transceiver sends digital commands to one or more connected luminaires via a bidirectional bus. These commands are received by a luminaire transceiver and executed by an associated microprocessor (a client controller) in communication with a ballast controller and a lamp. DALI commands are conventionally 16 bits long, and composed of an address byte (either an address of a single luminaire, or a group address for a group of luminaires) followed by a data byte, which causes the DALI receiver to execute one or more commands. Exemplary commands include setting the luminaire or executing one or more preset lighting scenes. The DALI standard also supports commands indicating lamp status, a power failure condition, a lamp or lamp component failure condition, etc. The DALI data communications rate is specified as 1200 baud, which is relatively slow by today's digital communications standards.

Topologically, multiple DALI devices receive and send commands to and from the DALI controller over a two wire data bus. According to the DALI standard, this control bus may also supply ≤250 mA at 16 V DC, allowing each device to draw 2 mA, which is typically sufficient to power the on-luminaire transceiver and control electronics. Power for the lighting ballast is typically supplied by building mains power (i.e., 120V AC). In certain installations of DALI connected luminaires, the DALI wiring has 4 or 5 conductors: two conductors for the data bus, and 2 or 3 for AC power (e.g., line, neutral and ground).

SUMMARY OF THE INVENTION

Embodiments of the invention are directed toward systems and methods for distributing power and data from high power, high data rate PoE input port link segments to multiple illuminators, such as exit signs, using relatively lower power and lower data bandwidth links. Inventive embodiments provide a way to integrate and translate between a high bandwidth upstream data link over a PoE connection and a relatively low bandwidth communications link to individual illuminators. DALI is one such example of a relatively low bandwidth communication method usable in conjunction with embodiments of the invention.

In certain embodiments, the invention is directed to a system for powering emergency exit signs using PoE, where power is distributed from one piece of PoE power sourcing equipment ("PSE") to multiple exit signs, while at the same time, providing a low speed communication link, e.g., a digital communication link, between the exit signs and upstream Ethernet connected devices. In certain embodiments, an interface-converter-distribution module ("ICDM") is provided, which acts as a PoE PD, receiving power from a connected PoE PSE, such as a PoE network switch or gateway. The ICDM includes a POE interface, which extracts DC power from the PoE port link segment and separates it from the Ethernet data. The ICDM also includes an IP Ethernet transceiver, which communicates TCP/IP data with the PSE and upstream connected networked devices. The ICDM also includes an Ethernet to low-speed digital communications interface (itself including a microprocessor and associated memory, and optionally a mux/demux module), which translates instructions received over the high-speed data streaming PoE link to a low speed digital protocol, and distributes the translated data signal among one or more distribution module outputs. There is a disparity between the Ethernet and DALI protocols. Ethernet data communications is a high-speed data streaming format, while DALI is a low-speed data packet format. Communicating between the Ethernet high-speed data streaming format and the DALI low-speed data packet format is done with a medium access control (MAC) controller with data packet caching and filtering capability. This serves as a data parsing device. Exemplary low speed digital communications protocols include I²C and DALI, but others are usable. Distribution modules using DALI include one or more DALI controller modules, which include DALI transceivers and components for generating low power DC voltage for powering downstream components (e.g., 4W at 16 VDC).

In certain embodiments, the ICDM includes a plurality of output ports, each supporting an 8 conductor cable (e.g., an Ethernet cable). The distribution module defines a bus topology on each connected output cable, where a first pair of conductors is for the generated low speed digital data (and any associated low power DC signal), a second pair of conductors is for low power DC and the last two pairs of conductors carry high power DC (i.e., the DC power supplied by and passed through from the PoE input). The DC power on the second, third and fourth conductor pairs is generated by a power converter and power distribution module in the ICDM, which distributes the extracted PoE received power, and generates the low power DC signal on the second conductor pair. In certain embodiments, the output parts are RJ45 Ethernet jacks. This arrangement produces a plurality of output lines which carry (1) low speed digital communications and (2) DC power extracted from the PoE link and (3) lower voltage DC power generated from the supplied PoE power.

Certain embodiments provide a plurality of junction boxes, each connected to an output of the distribution module. Because of the high power available under current PoE standards and the high efficiency of LED lighting, each junction box is capable of supplying power to a plurality of PoE illuminated exit signs. In certain embodiments, junction boxes are passive devices which, apart from filtering and isolation functionality, simply divide input power and data among a plurality of outputs, which are connected in parallel. In other embodiments, junction boxes are active devices that support upstream communications, with, for example, active distribution modules (e.g., mux/demux modules or repeaters) and other devices coupled thereto, and downstream communications with illuminated exit signs.

Embodiments of the invention have certain advantages. Because of the POE system's point-to-point topology, sharing of power across two or more PDs directly from one source (PSE port) is generally not possible, even though doing so would be desirable when the individual PDs are very low-power PDs. If multiple individual low power PDs cannot share the power of a single PoE port link segment, then the power available on a PoE port link segment will be underutilized. However, exit signs are typically low power devices, particularly exit signs that rely on LED illumination, so driving a single exit sign with a direct PoE link would be wasteful. By dividing the PoE power among multiple low-power illuminators, inventive embodiments make efficient use of the available PoE power.

Similarly, the two way data requirements for communicating with "smart" exit signs will typically be relatively low, and so using a dedicated PoE link to drive an exit sign would be wasteful in terms of bandwidth. Additionally, communications over one PoE Port Link Segment directly to multiple PDs is generally not permitted. Inventive embodiments use the available communications bandwidth from a PoE link more efficiently, by down converting downstream IP communications to a low speed format such as DALI, which can then be distributed directly to multiple illuminators.

Additionally, by replicating a conventional bus topology for power, similar to the conventional method of driving a number of lights connected in parallel across a mains connected bus, elements of the invention facilitate multiple load power sharing, so long as the number of loads does not exceed the branch source current limit; e.g., 20 Amps or 30 Amps, etc. This sort of power sharing of load power is inherently passive between loads and is not controlled by the branch source, which is only limited by the overall power available on an output cable from the ICDM.

Additional advantages will be evident upon consideration of the detailed description of the preferred embodiments set forth below.

BRIEF DESCRIPTION OF THE DRAWINGS

The invention will be more fully understood by referring to the following Detailed Description of Specific Embodiments in conjunction with the Drawings, which are embedded in the Detailed Description below.

DETAILED DESCRIPTION OF THE SPECIFIC EMBODIMENTS

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may not be shown in a given drawing or described in detail to avoid obscuring aspects of an embodiment of the invention that are being discussed.

Figure 4:
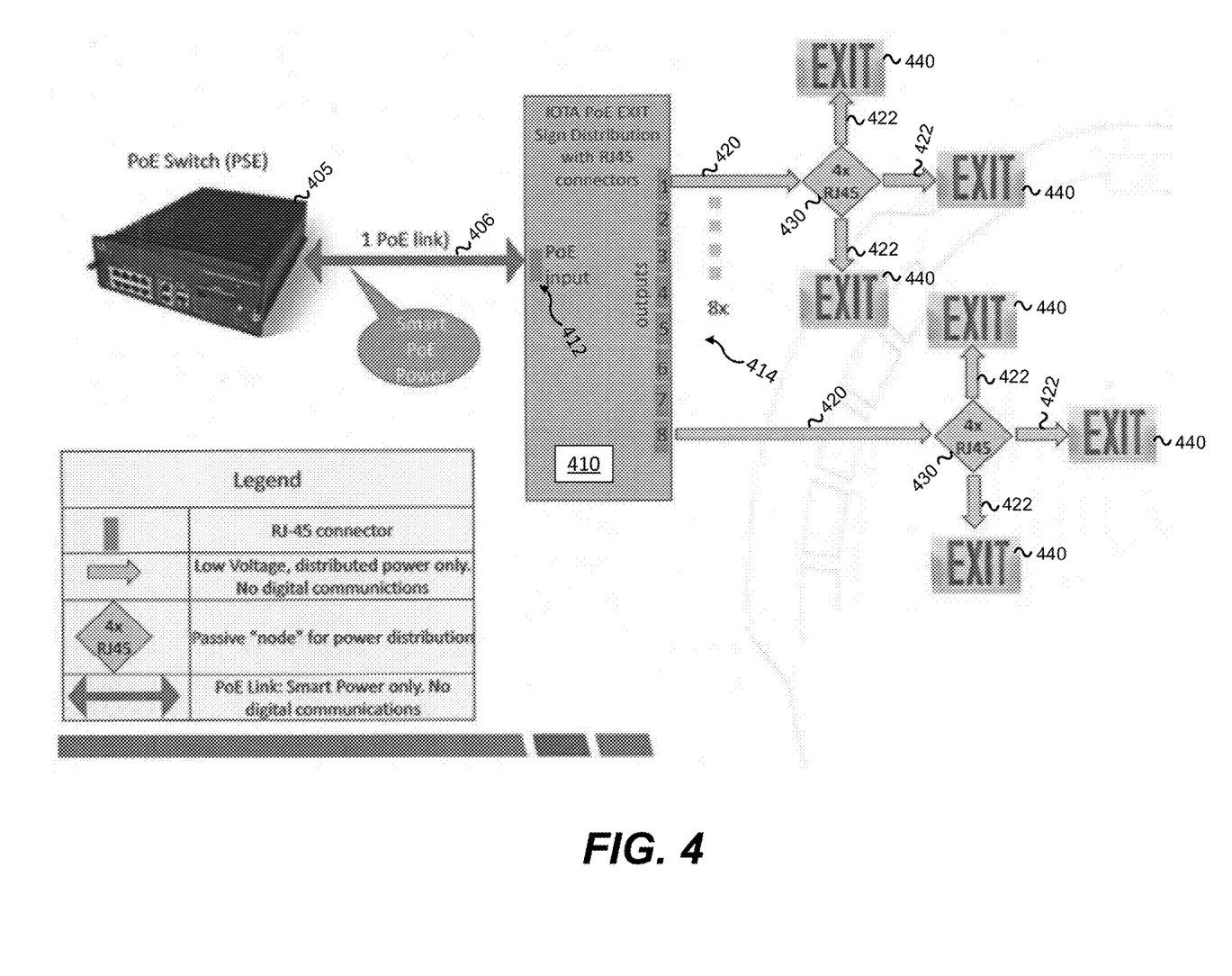
FIG. 4 is a schematic illustration of a PoE exit sign illumination system according to an inventive embodiment using passive components.

FIG. 4 is a schematic illustration of an arrangement for supplying power to building illumination fixtures, which may be illuminated exit signs, using a PoE Ethernet link. In the arrangement of FIG. 4, and in contrast to the conventional PoE lighting arrangement depicted in FIG. 3, power is not extracted directly from the PoE link 406 at each LED luminaire (residing within exit signs 440). Instead, power is extracted at an intervening distribution module 410. In the arrangement of FIG. 4, PSE 405 (in this case, a PoE switch) in connected via an Ethernet link 406 (i.e., a single RJ45 cable) to the distribution module 410. The distribution module 410 includes a PoE input port 412 to receive the Ethernet link. Distribution module 410 extracts power from the attached PoE link 410 and distributes it among a plurality of outputs 414; for example, eight RJ45 outputs. Other types of connectors may also be used. In one embodiment, this is accomplished by extracting the DC voltage supplied on the spare twisted pairs described above with respect to FIG. 2 and applying this voltage, in parallel, across a pair of conductors on each exit port 414. The power extraction and division functions of distribution module 410 may be performed by a power and data separator 602, which is described more fully below in reference to FIG. 6, but where the data signal is discarded.

In one embodiment, the outputs 414 of distribution module 410 are connected directly to one or more fixtures 440, which in the case of FIG. 4 are illuminated exit signs. The fixtures 440 use received power to power an LED driver, battery charging and management circuitry, and other components that are described more fully below with respect to FIG. 9. The distribution module 410 of FIG. 4 is optionally connected to one or more junction boxes 430, which have one RJ45 (or other type connector) input and three RJ45 (or other type connectors) outputs. Junction boxes 430 divide the power received from distribution module 410 among one or more loads, i.e., connected LED luminaires in connected illuminated exit signs 440. Power is routed from the optional junction boxes 430 to each sign by another cable 422, and signs 440 include input jacks for receipt of power.

In the embodiment of FIG. 4, junction boxes 430 and the distribution module 410 are passive components, in that they do not support digital data communication. Instead, their functionality is limited to dividing and pass through DC power, while also providing optional isolation and filtering functionality. Because pins on the output cables 420 are not required for digital data communication, the precise pin out for power on exit ports 414 is flexible. In the event that Ethernet cabling is used, any or all of the RJ45 data pairs can be used for power. Additionally, any pair of conductors can be chosen to provide the supplied voltage to attached LED luminaires. In one embodiment, junction boxes 430 simply connect each pin on an incoming cable 420 with corresponding pins on all outgoing cables 422. Because the power requirements for LED luminaires are low and cables 420 and 422 need not support high speed digital data communication, those cables need not be state-of-art Cat 5+ cable capable of supporting 1 Gb/s, but rather, can be low-cost Cat 5 or Cat 3 cable (or other types).

Figure 5:
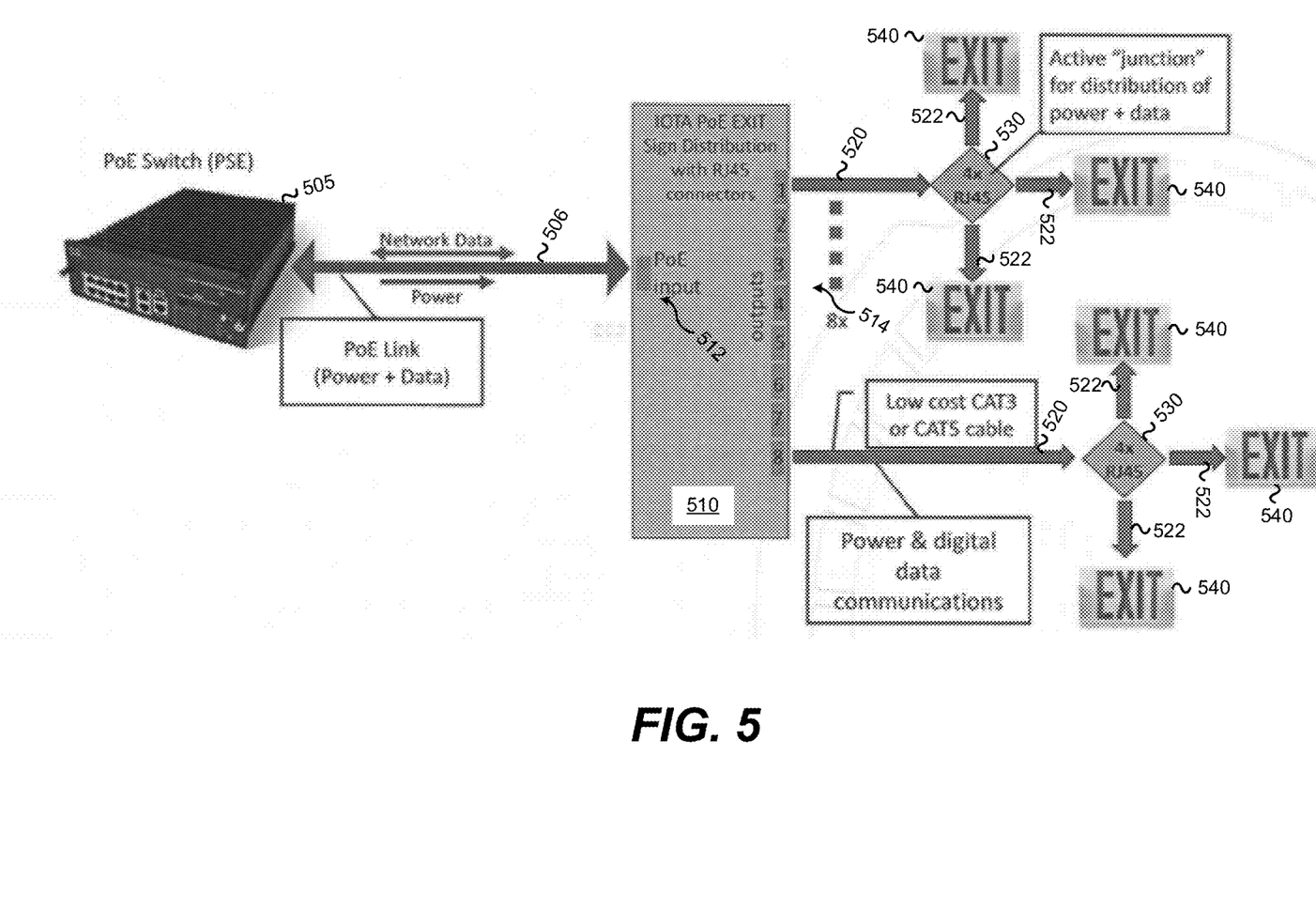
FIG. 5 is a schematic illustration of a PoE exit sign illumination system according to an inventive embodiment using active components.

FIG. 5 is a schematic illustration of an alternative arrangement for illuminating building exit signs using a PoE Ethernet link. In the arrangement of FIG. 5, power is also extracted from a connected PoE link 506 by a distribution module 510, which has one Ethernet input 512 and a plurality (e.g., eight) output ports 514. As in the arrangement of FIG. 4, an exemplary PSE 505 in the arrangement of FIG. 5 is a PoE switch. The distribution module 510 of FIG. 5 extracts power from the attached PoE link 506 and distributes it among a plurality (e.g., eight) output ports 514. In one embodiment, this is accomplished by extracting the DC voltage supplied on the spare twisted pairs described above with respect to FIG. 3 and applying this voltage, in parallel, across a pair of conductors on each exit port 514

As with the embodiment of FIG. 4, outputs 514 may be connected directly to exit signs 540, but in other embodiments, distribution module 510 of FIG. 5 is connected to one or more junction boxes 530. Junction boxes 530 have one input and three outputs, and serve to further divide the power received from distribution module 510 among one or more loads, i.e., connected LED luminaires in connected illuminated exit signs 540. As in FIG. 4, the junction boxes 530 are connected to individual exit signs 540 to be illuminated with cable 522, and the exit signs 540 include jacks for receipt of this cable 522.

In the embodiment of FIG. 5, the distribution module 510 and junction boxes 530 are active components, in that, in addition to including circuitry for dividing and passing through power or re-distribution of power, these components also support two-way digital communications with attached devices 540 and with upstream network components such as PSE 505 (e.g., a PoE switch). In particular, the distribution module 510 of FIG. 5 includes a microprocessor or microcontroller and is capable of communicating as an IP device with PSE 505 and all upstream connected devices over the connecting Ethernet link 506. The distribution module 510 is also capable of digital communication with junction boxes 530, which themselves include microprocessors/microcontrollers in certain embodiments. In one embodiment, downstream communication occurs according to conventional IP standards, and power data is supplied on the outputs 514 of the distribution module 510 according to the conventional PoE standards. In alternate and preferred embodiments, downstream communication, through junction boxes 530 and with individual exit signs 540, is conducted through a low speed digital communication protocol like $I^2C$ or DALI. The use of a low speed protocol is advantageous because of the possibility of many junction boxes 530 and associated exit signs 540 being connected to a single distribution module 510. For example, in the embodiment of FIG. 5, up to 24 individual signs 540 may be connected to send data to a single distribution module 510. In order for these communication streams to be multiplexed and passed upstream from the distribution module 510, the bandwidth of each stream is kept relatively low so as to not exhaust the bandwidth of the Ethernet connection between the distribution module 510 and the PSE 505, which is one embodiment, is a 1 Gbit/s connection.

The arrangement of FIG. 5 supports data and control communications between an attached network and the powered exit signs 540. Exemplary communications include: querying status of an exit sign, receiving diagnostic and/or status from an exit sign, controlling an operating state of an exit sign, and controlling the operating state of other devices attached to the sign such as emergency lamps, temperature sensors, cameras, microphones and motion sensors. Systems according to the invention can change the illumination color or illumination level of an individual exit sign, can strobe an exit sign, or can turn off an exit sign in response to network commands. This functionality may be useful, for example, where a portion of a building is on fire, flooded, or contains some other localized hazard. Additionally, by controlling the state of multiple exit signs, systems according to the invention can define pathways through buildings to certain designated exit points. Additionally, by receiving data regarding the current (I) and/or voltage (V) characteristics of the LED lamps lighting the exit signs, attached network systems can monitor the performance of a sign and predict its remaining lifetime. Additionally, systems according the invention can direct an exit sign to enter or exit a backup battery state, or communicate a power down condition.

In embodiments using DALI, standard commands can be passed to the illuminator, such as: Set Illumination Value, Turn Off, Turn On, Increment Value, Decrement Value, Set Step, Set Max, Set Min, Go To Max, Go to Min, Set Group, etc. Standard DALI queries can also be issued, such as: performance status, device status, is the lamp on, current power level, etc. Because individual lamps or pre-defined groups of lamps are addressable under DALI, any of these commands or queries can be provided to multiple lamps. Additionally, custom commands and queries can be programmed that are particularly useful for exit signage such as: initiate self-test (30 second test), initiate annual self test (90-minute test), simulate power down condition, self-test pass/fail status, battery voltage during self-test, battery charging current status, battery age, battery fully charged status, sign status (e.g., ready, charging, needs service), and/or self-test schedule and history.

In the embodiment of FIG. 5, the distribution module 510 is referred to as an Interface-Converter-Distribution Module ("ICDM"). The ICDM is connected directly to a single PoE Port source 505 via a Link Segment 506. ICDM 510 terminates the PoE Port Link Segment 506 with a proper PoE PD interface for both power and data communications, and establishes a network local IP address as a proper PoE PD. The ICDM 510 separates the power-supplying DC offset from the data signals, then converts the data signals into signals appropriate for distribution to individual lighting devices such as the emergency exit signs 540 via a "bus" distribution topology. To accomplish this, the PoE digital communications data transfer format is converted from a point-to-point format to a point-to-multipoint (or "broadcast") format. Physically, the ICDM 510 transforms the data communications topology from a "star" topology to a "bus" topology to compliment the power distribution topology. Additionally, the ICDM 510 translates between the incoming high-speed data communications protocol to a lower-cost, lower-speed, locally-managed, "commissioning" protocol, such as DALI, which permits multiple devices (e.g., emergency exit signs) to be individually addressed and individually transfer data to and from the emergency exit signs over a common communications bus.

Figure 6:
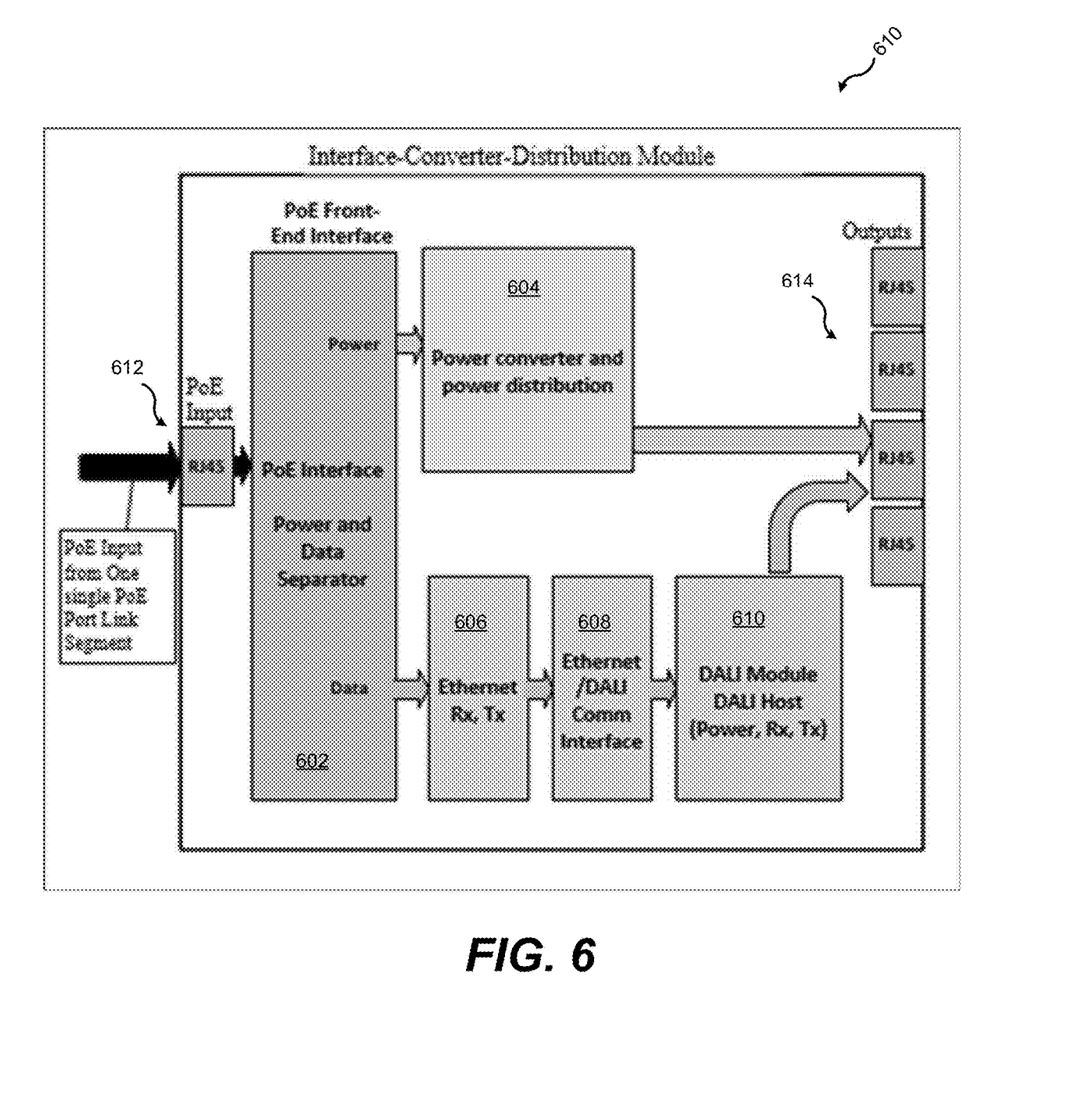
FIG. 6 is a block diagram of a PoE connected interface-converter-distribution module according to an inventive embodiment.

FIG. 6 is a block-level schematic of example ICDM 610. The ICDM 610 receives a PoE signal including data and DC power via the input port 612, e.g., a standard RJ45 jack. The input signal is received by a front-end POE interface 602, which separates the DC component of the signal (used for power delivery) from the data component. The data component is directed to a standard Ethernet transceiver 606 which in turn passes the data signal to an Ethernet/Low Speed communications interface 608, which in this example is an Ethernet/DALI interface. Communicating and interfacing between the TCP/IP Ethernet high-speed data streaming format and the DALI low speed data packet format is done with a medium access control (MAC) controller with data packet caching and filtering capability. This serves as a data parsing device which is customized to the given need, such as, communicating/interfacing with other low-speed protocols other than DALI. This interface translates between Ethernet-compliant data signals and DALI-compliant data signals (or another appropriate protocol for controlling lighting devices and similar elements). The DALI-compliant signals are handled by a DALI host module 610 (e.g., a DALI controller) which passes appropriate commands to various devices and, in some embodiments, receives communications from the devices. The signal from the DALI host module 610 is distributed to one or more output connections 614 through mux/demux circuitry in host module 610. Outputs 614 are standard RJ45 jacks. The ICDM also outputs appropriate DC power to the connected devices via a power conversion and distribution module 604. Power conversion and distribution module 604 splits extracted DC power from the PoE input among outputs 614. Additionally power module 604 optionally generates a low power, lower voltage DC power suitable for powering logic components like downstream DALI client transceivers located in individual exit signs. These power signals may be provided on conductors separately from those carrying low-speed digital data, as will be discussed further in connection with FIG. 7.

Figure 7:
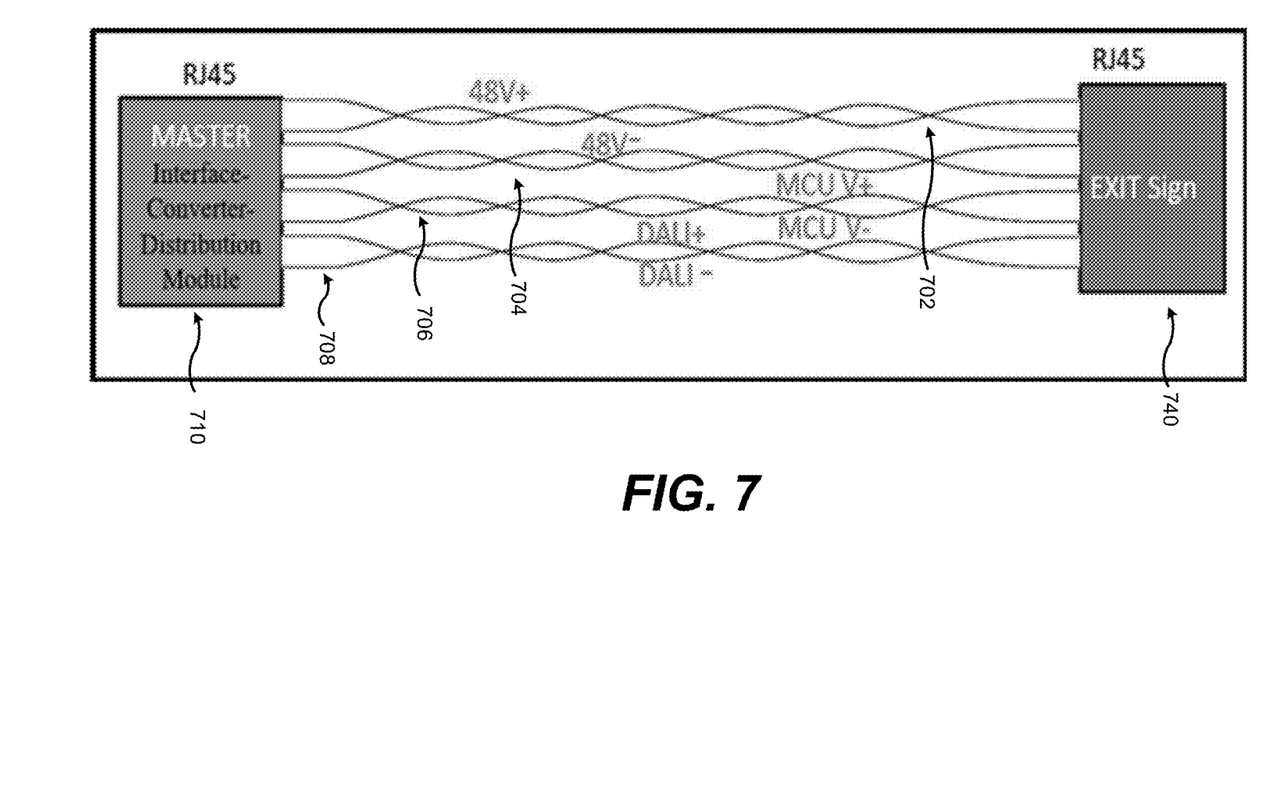
FIG. 7 is a schematic illustration of an interface converter distribution module supplying power to, and in communication with, an exit sign in certain embodiments.

FIG. 7 is a schematic illustration of an interface converter distribution module supplying power to, and in communication with, an exit sign. FIG. 7 also shows the pin-out and arrangement for links (e.g., 520, 522) between the ICDM 710 and exit signs 740. FIG. 7 illustrates interconnection of the ICDM with a single exit sign for purposes of illustration. As was described above with respect to FIG. 6, ICDM 710 receives Ethernet signals and electrical power via standard PoE cabling and equipment. The ICDM 710 then converts the high-bandwidth point-to-point Ethernet signals into low-bandwidth broadcast signals. Using one or more standard RJ45 interfaces with 4 twisted pairs, the ICDM distributes power and data to the exit sign as follows: Two wires (twisted pair 702 in this example) jointly carry DC power at +48V and two wires (another twisted pair 704) jointly carry DC power at −48V. Another twisted wire pair 706 carries low-voltage DC power (e.g., +/−12V or +/−5V) to provide power to a microcontroller (not shown) housed within the exit sign 740. It will be appreciated that using multiple wires for DC power connections allows for increased current-carrying capacity of the cable relative to using only one wire for each DC power connection. This allows for the use of standard low-cost cabling. Finally, the wires in a 4th twisted pair 708 are used as individual data lines for transmitting control signals using DALI or another suitable protocol.

Figure 8:
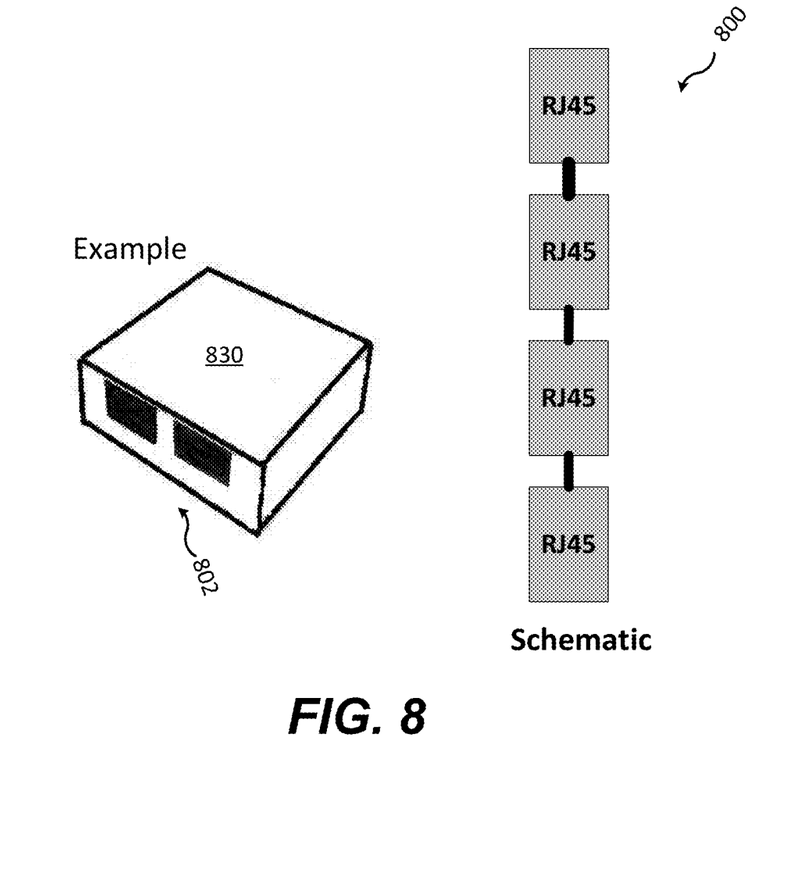
FIG. 8 is a schematic illustration of a junction module for use in a PoE exit sign illumination system according to an inventive embodiment using active components.

FIG. 8 schematically illustrates a passive junction module 830 according to an inventive embodiment, for example, junction module 530 described above in reference to FIG. 5. Junction box 830, enables multiple devices to be coupled together in parallel by connection to junction box's I/O ports 802, such that each pin of each device's RJ45 jack is tied to the corresponding pin of the RJ45 jack of all other connected devices. This enables the devices to be "daisy-chained" together, limited only by power requirements. This is illustrated schematically at 800.

Figure 9:
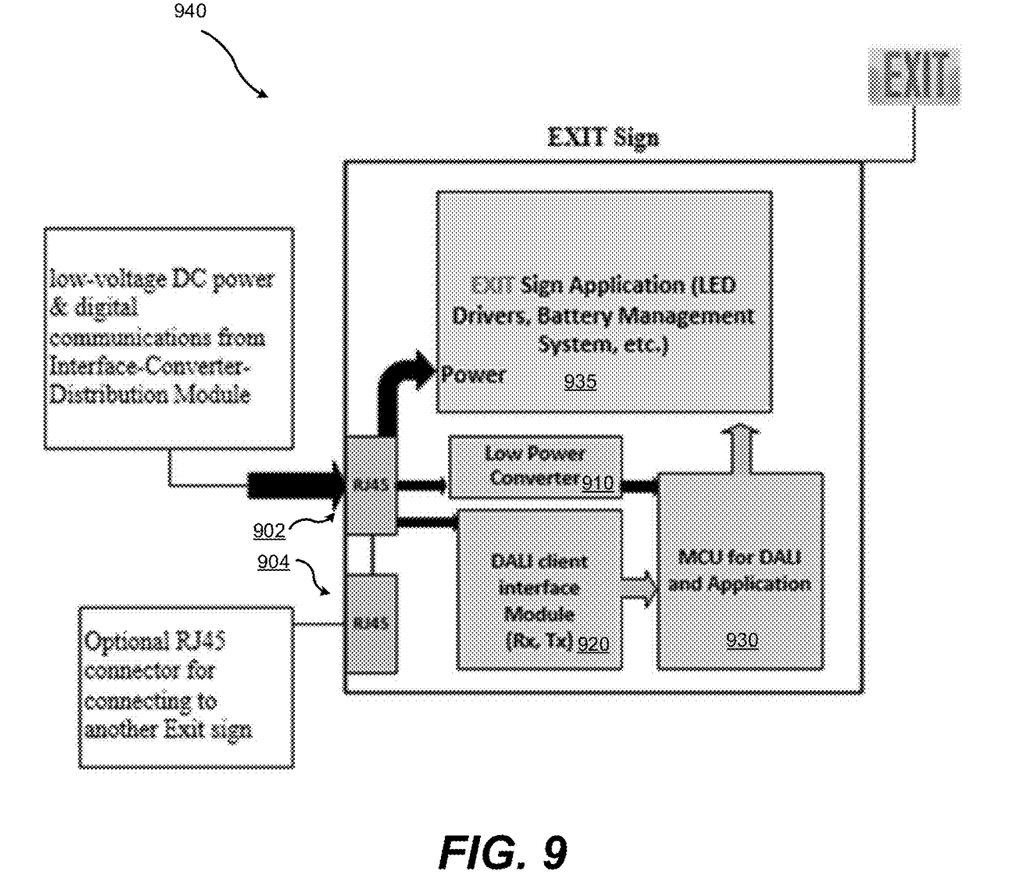
FIG. 9 a schematic illustration of an exit sign for use in a PoE exit sign illumination system according to an inventive embodiment using active components.

FIG. 9 shows an exit sign device 940 usable with an inventive embodiment. Sign 940 receives low-voltage power, higher voltage power (split from the original PoE input) and digital communication signals via an RJ45 or other standard input connector 902. In this example device, electrical power (i.e, 48 VDC) is passed to a lighting subsystem 935 which may include LED drivers and a battery management system for supplying backup power. A PoE powered light fixture incorporating battery backup is described in detail in co-owned U.S. Pat. No. 9,609,706, which is incorporated by reference herein in its entirety. In certain embodiments, exit sign 940 includes a low power converter 910, which steps down and filters the high (e.g., 48 VDC voltage) PoE voltage to an appropriate voltage (e.g., 12V, 5V, 3.3V, or similar) to a microcontroller-based application circuit 930, and/or DALI client interface module 920, which control the lighting subsystem 935 in response to digital communications received from the ICDM which are addressed to the particular fixture, as described above. Alternatively, this lower voltage is taken directly from a pair of conductors on which it has been generated, e.g., pair 706 described above with respect to FIG. 7. Alternatively, supply voltage for the logic components of the exit sign (e.g., 920 and 930) is taken directly from the conductor pair that carries the DALI control signals.

Sign 940 includes a client interface module 920 (i.e., a transceiver) which communicates via the DALI protocol between microprocessor 930 and the upstream ICDM. Microprocessor 930 is a DALI client controller which controls lighting drivers and application circuits (present in lighting subsystem 935) in accordance with standard DALI commands or custom programed commands addressed for the particular fixture. Exit sign 940 device (or similar device) optionally includes a second I/O receptacle 904

(e.g., an RJ45 jack), which has an exact pin-to-pin correspondence with input jack 902, enabling multiple devices to be daisy-chained together in a bus configuration, for example, by direct connection or through a junction module 430. It should be appreciated that when the connected devices such as exit signs 940 are optionally supplied with a "daisy-chaining connector" such as the receptacle 904, junction boxes 430 may be eliminated by directly daisy-chaining devices together and connecting one device to an ICDM 410.

As is described above, under DALI a DALI host communicates with a DALI client by broadcasting addressed data messages on a bus, which are received and executed by attached individual devices. In embodiments of the invention, the DALI host, located physically in the ICDM, receives instructions that have been translated, and in certain cases demultiplexed, from an Ethernet IP data stream. The Ethernet/DALI communications interface 608, the DALI host controller 610 and the DALI client controller 930 are all, optionally, microprocessors operating in conjunction with non-volatile storage hosting computer readable instructions. In certain cases, these modules can be combined in a single microprocessor, for example, the Ethernet/Dali communications interface and the DALI host controller can be so-combined. In other embodiments, the functionality of these components can be realized in dedicated hardware, such as one or more field programmable gate arrays or application specific integrated circuits.

Figure 10:
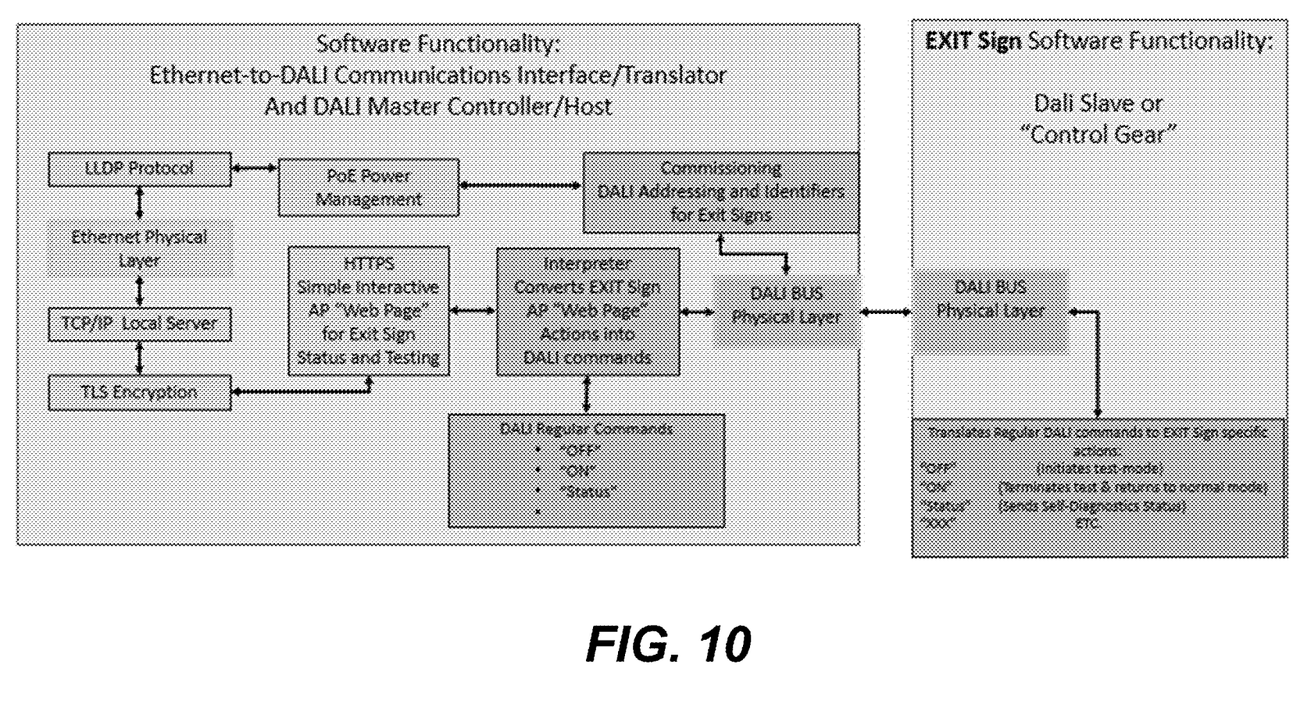
FIG. 10 is a schematic diagram representing software modules executed by these processing components operating according to inventive embodiments.

FIG. 10 is a schematic diagram representing software modules executed by these processing components, which relate to intercommunication of lighting commands, queries and responses, and commissioning process (i.e., the process by which fixture addresses and group addresses are assigned). In certain embodiments, lighting commands and queries are built in conjunction with an interactive web application running on a non-illustrated computer executing computer readable instructions stored in non-volatile memory, which computer is in IP network communication with a PSE connected to the ICDM, e.g., PSE 505 in FIG. 5. A software interpreter module converts the illuminator communications into DALI commands, which are broadcast to components (e.g., signs) interfacing with a DALI bus physical layer (e.g., 708 in FIG. 7), for execution. Software executed by the DALI client MCU (e.g., 930) executes these commands in conjunction with the lighting subsystem 940. A similar process is used for commissioning of the illuminators.

Embodiments may further include interconnections (cable & connectors) from the ICDM to the Emergency EXIT Signs using standard Ethernet cable such as Category 5/5e type and standard Ethernet Registered Jack 45 (RJ45) connectors. Repurposing and using standard Ethernet cable & connectors facilitates many advantages, including for example: low-cost, established infrastructure; installation availability and efficiency; and building code-compliance, among others. Junction boxes in such embodiments enable low-cost and effective aggregation of multiple devices (such as Emergency EXIT Signs) downstream on the bus and facilitate a formative network layout.

It should be appreciated that the embodiments disclosed herein can be tailored to provide a communications network including various sub-systems that are appropriately scalable in functionality and complexity. For example, some sub-systems may provide virtually no communication functionality (e.g., providing power only), while other sub-systems may be tailored provide full two-way data communications, as appropriate for any particular application.

It should also be appreciated that while the foregoing detailed description relates primarily to LED illuminated exit signs, but this should not be construed as a limitation on the invention. Inventive embodiments are equally applicable to controllable lighting of all sorts, including general building lighting, and fluorescent and incandescent fixtures as well as LED fixtures.

While the preferred embodiments of the present invention have been illustrated in detail, it should be apparent that modifications and adaptations to those embodiments may occur to one skilled in the art without departing from the scope of the present invention.

What is claimed is:

1. A PoE illumination system,
a PoE input;
a power and data separator in electronic communication with the PoE input, the power and data separator having a power output and a bi-directional data output;
an Ethernet transceiver in electronic communication with the bi-directional output of the power and data separator;
a communications interface module in electronic communication with the Ethernet transceiver;
a digital lighting controller including a digital transceiver in communication with the communications interface module, the lighting controller having a data output and configured to:
receive a first set of digital lighting control instructions according to a first digital communications standard at a first bitrate;
translate the first set of digital lighting control instructions into a second set of digital lighting control instructions according to a second digital communications standard at a second bitrate slower than first bitrate; and
output the second set of digital lighting control instructions via the data output;
a power distribution module in electronic communication with the power output of the power and data separator, and
a lighting power and control output having a plurality of conductor pairs, a first pair in electronic communication connected to receive an output of the power distribution module, and a second pair connected to receive an output of the digital lighting controller.

2. The system of claim 1, wherein the power distribution module is configured to supply a PoE DC power voltage present on the PoE input to the first pair of conductors.

3. The system of claim 1, wherein the lighting power and control output is an RJ45 jack.

4. The system of claim 1, wherein the digital lighting controller is a DALI host controller.

5. The system of claim 1, further including an illumination fixture electrically connected to the lighting power and control output via an Ethernet cable.

6. The system of claim 5, further including a junction box comprising a plurality of RJ45 jacks electrically connected in parallel, wherein the junction box is electrically connected between the illumination fixture and the lighting power and control output.

7. The system of claim 5, wherein the illumination fixture includes a DALI client controller in electronic communication between the lighting power and control output and a lighting driver.

8. The system of claim 7, wherein the illumination fixture is an illuminated building exit sign.

9. The system of claim 8, wherein the illuminated building exit sign includes one or more LED lamps and a backup battery.

10. A method of supplying power and data to a plurality of lighting fixtures, comprising:
receiving a first set of digital lighting control instructions encoded according to an Ethernet communication standard at a first bitrate and DC power at a first voltage over an PoE link;
providing the DC power at a first voltage to a plurality of lighting fixtures;
translating the first set of digital lighting instructions to a second set of digital lighting instructions encoded under a second digital communications standard, the second set of lighting instructions including instructions for the plurality of lighting fixtures;
providing the second set of instructions to the plurality of lighting fixtures at a second bitrate slower than the first bitrate.

11. The method of claim 10, further including generating DC power at a second voltage, and providing the DC power at a second voltage to the plurality of lighting fixtures.

12. The method of claim 11, wherein the DC power at a first voltage, the DC power at a second voltage and the second set of digital lighting instructions is provided to the plurality of lighting fixtures over one or more Ethernet cables.

13. The method of claim 10, wherein the plurality of lighting fixtures are an illuminated exit sign.

14. A method of operating a lighting fixture, comprising:
at an interface converter and distribution module:
receiving a first set of digital lighting control instructions encoded according to an Ethernet communication standard at a first bitrate and DC power;
providing the DC power to an Ethernet output;
translating the first set of digital lighting instructions to a second set of digital lighting instructions encoded under the DALI standard;
providing the second set of digital lighting instructions to the same Ethernet output at a second bitrate slower than the first bitrate.

15. The method of claim 14, further including, transmitting the DC power and the second set of digital lighting instructions to a lighting fixture via an Ethernet cable.

16. The method of claim 15, further including, at the lighting fixture, powering the lighting fixture with the received DC power, and operating the lighting fixture in accordance with the received second set of digital lighting instructions.

17. The method of claim 16, wherein the lighting fixture is an illuminated exit sign.

18. The system of claim 1, wherein the lighting controller is configured, when translating the first set of digital lighting control instructions, to:
translate a multi-fixture lighting control instruction specifying settings of multiple lighting fixtures of a plurality of lighting fixtures into separate lighting instructions for each of the plurality of lighting fixtures identified by the multi-fixture lighting instruction.

19. The method of claim 10, wherein receiving the first set of digital lighting control instructions includes receiving a multi-fixture lighting control instruction specifying settings of multiple lighting fixtures of the plurality of lighting fixtures; and
wherein translating the first set of digital lighting instructions to the second set of digital lighting instructions includes generating, as the second set of digital lighting instructions, separate lighting instructions for each of the multiple lighting fixtures identified by the multi-fixture lighting instruction encoded according to the DALI standard.

20. The method of claim 14, wherein translating the first set of digital lighting instructions to the second set of digital lighting instructions encoded under the DALI standard includes:
translating a multi-fixture lighting control instruction specifying settings for a plurality of lighting fixtures into separate lighting instructions for each of the plurality of lighting fixtures identified by the multi-fixture lighting instruction.

* * * * *